United States Patent [19]
Colavito et al.

[11] Patent Number: 5,634,598
[45] Date of Patent: Jun. 3, 1997

[54] ABRASION RESISTANT LINED SWEEP NOZZLE

[75] Inventors: Dominick Colavito, Bangor, Pa.; William Peschler, Sayerville, N.J.; Douglas Vanderbilt, Orland Park, Ill.

[73] Assignee: Minerals Technologies, Inc., New York, N.Y.

[21] Appl. No.: 309,308

[22] Filed: Sep. 20, 1994

[51] Int. Cl.⁶ .................................................. B05B 1/00
[52] U.S. Cl. .................................... 239/591; 138/DIG. 6
[58] Field of Search ................................ 239/591, 654; 138/DIG. 8, DIG. 11, DIG. 6, 120, 155, 118; 451/102, 90

[56] References Cited

U.S. PATENT DOCUMENTS

| | | | |
|---|---|---|---|
| 973,940 | 10/1910 | Jones . | |
| 1,081,950 | 12/1913 | Eller . | |
| 1,958,085 | 5/1934 | Hammon | 158/27.4 |
| 2,297,239 | 9/1942 | Neugebaur et al. | 60/35.6 |
| 2,342,052 | 2/1944 | Morris | 138/155 X |
| 2,428,278 | 9/1947 | Griswold | 451/102 |
| 3,698,646 | 10/1972 | Robba et al. | 239/591 |
| 3,722,821 | 3/1973 | Jaeger et al. | 239/133 |
| 3,831,857 | 8/1974 | Scott | 239/424 |
| 3,900,675 | 8/1975 | Olcott | 428/367 |
| 4,168,033 | 9/1979 | von Bernuth et al. | 239/591 |
| 4,419,971 | 12/1983 | Nakamura et al. | 123/193 C |
| 4,473,171 | 9/1984 | Nunlist | 220/465 |
| 4,528,782 | 7/1985 | Bean | 51/439 |
| 4,684,155 | 8/1987 | Davis. | 138/DIG. 6 X |
| 4,770,346 | 9/1988 | Kaczynski | 239/73 |
| 4,779,586 | 10/1988 | White, Jr. | 123/198 E |
| 4,834,297 | 5/1989 | Cumming et al. | 239/690 |
| 4,877,705 | 10/1989 | Polidor | 428/34.6 |
| 4,950,627 | 8/1990 | Tokarz et al. | 501/95 |
| 4,976,288 | 12/1990 | Steele et al. | 138/155 X |
| 5,137,789 | 8/1992 | Kaushall | 428/472 |
| 5,199,649 | 4/1993 | Tolboll | 239/600 |
| 5,200,241 | 4/1993 | Nied et al. | 428/34.6 |
| 5,211,999 | 5/1993 | Okada | 428/34.5 |

FOREIGN PATENT DOCUMENTS

| | | | |
|---|---|---|---|
| 123433 | 8/1900 | Germany | 138/155 |
| 665173 | 5/1979 | U.S.S.R. | 138/DIG. 8 |
| 2176865 | 1/1987 | United Kingdom | 138/155 |

*Primary Examiner*—Kevin Weldon

[57] ABSTRACT

This invention relates to a nozzle and a nozzle mix gunning system incorporating the nozzle for pneumatically propelling dry or wetted particulate gunning material toward a substrate a distance removed from the nozzle and at an angle to the line of sight of the operator. The nozzle comprises a plurality of substantially straight tubular sections. Each section is lined with an abrasion resistant material, and joined to the other sections in a manner that produces a curvature in the nozzle.

10 Claims, 1 Drawing Sheet

ABRASION RESISTANT LINED SWEEP NOZZLE

TECHNICAL FIELD

This invention relates to a method and apparatus for pneumatically propelling a granular material at or onto a substrate. More particularly, the invention relates to a nozzle for directing dry or wetted particulate gunning material, suspended in air or in a liquid stream, toward a substrate a distance removed from the nozzle.

BACKGROUND OF THE INVENTION

Nozzle mix gunning operations employ an apparatus for pneumatically propelling dry or wetted granular material through a hose and nozzle combination at or onto a substrate located a distance from the nozzle. Common gunning materials include, for example, refractory and insulating products, which are applied so as to at least partially coat the surface of a substrate. Alternatively, sand or other abrasives may be gunned against the outer surface of a substrate to clean or otherwise condition the substrate.

Typically, the granular material to be gunned is ground to a desired particulate size and deposited within a sealed tank or hopper (known as a gun) where the particulates are mixed with a gas, such as air, at elevated pressure. The particulate/air mixture is thereafter released from the gun through a valve, whereupon the mixture passes through a hose and out the nozzle of the gunning apparatus, which is used to direct the mixture at the surface of the substrate.

Nozzle mix gunning operations are most effective when the granular material is gunned directly at the surface of the substrate, that is, at a 90° angle or perpendicular to the surface. Gunning at an angle other than 90° results in rebound; that is, material that should stick to the substrate surface, which instead bounces off the surface. Excessive rebound results in the waste of a significant portion of the granulated material, which is not only costly, but also raises cleanup, contamination, and disposal problems.

With a straight nozzle, the mix can only be gunned at a 90° angle to the surface when the surface is directly in front of the operator. If the surface to be gunned is inside an enclosed volume, such as a furnace, or if the operator must reach any appreciable distance across a substrate surface with a straight nozzle, it becomes impossible to gun the material at a 90° angle to the surface, and increased rebound results.

Traditionally, a smoothly curved nozzle or haphazard arrangement of pipe fittings has been used to insure that the material is gunned at the proper angle. A curved nozzle allows an operator to apply a refractory coating to the entire inner surface of an enclosed space, without the need to enter the enclosure as would be required with a straight nozzle. However, pipe fittings and smoothly curved nozzles have two important shortcomings; use of these nozzles results in an increase in the divergence and material separation in the stream of gunned material, allowing a significant amount of material to impact the surface at an angle other than 90°, which increases rebound and pipe drip; and, a steel sweep will only last 5 to 30 minutes in pneumatic gunning, depending on the grade and thickness of the steel, because the impact of the abrasive gunned material wears away the interior surface of the nozzle. Therefore, there is a need in the art for an improved device capable of overcoming the problems encountered with the prior art devices described above.

SUMMARY OF THE INVENTION

The present invention provides a novel and advantageous means for directing a flow of particulate material with a gunning apparatus at a substrate surface at an angle of substantially 90°, minimizing the divergence and rebound and optimizing the properties of the stream of gunned material so that these properties are similar to those produced by a straight nozzle, while maximizing the life expectancy of the nozzle.

One embodiment of the invention relates to a nozzle comprising a plurality of tubular sections and means for joining the sections together. Each section has an inner surface with a abrasion resistant material, such as a ceramic, elastomer, or plastic, adjacent thereto for protecting the surface against abrasion. The abrasion resistant material forms an internal bore which is substantially straight to facilitate flow therethrough.

Each nozzle section has at least one end portion which is angled, so that when joined, the sections produce an angle of curvature in the nozzle of between about 25° and 90°. Preferably, at least three tubular sections are joined to produce an angle of curvature in the nozzle of between about 45° and 90°. Advantageously, at least four tubular sections are joined to produce an angle of curvature in the nozzle of between about 55° and 85°. The most preferred angle is about 70°.

The ceramic material of the preferred embodiment may be a single substantially tubular ceramic liner component or a plurality of ceramic tiles which are interconnected to form the liner component. Only two or three different tubular sections can be utilized to form the nozzle. Preferably, the ceramic material is alumina, silicon carbide or zirconia toughened alumina.

The invention also relates to a nozzle mix gunning system comprising means for entraining a particulate material within a fluid stream, nozzle means for directing the entrained material against a surface, and means for directing the entrained material to the nozzle; wherein the nozzle means comprises one of the nozzles described above. The fluid stream may be air or water so that the entrained material can be applied dry or wet. Also, the nozzle means generally includes means for connection to the entrained material directing means, such as a threaded portion on the exterior surface of one of the tubular sections.

DETAILED DESCRIPTION OF THE PREFERRED EMBODIMENTS

Figure 1:
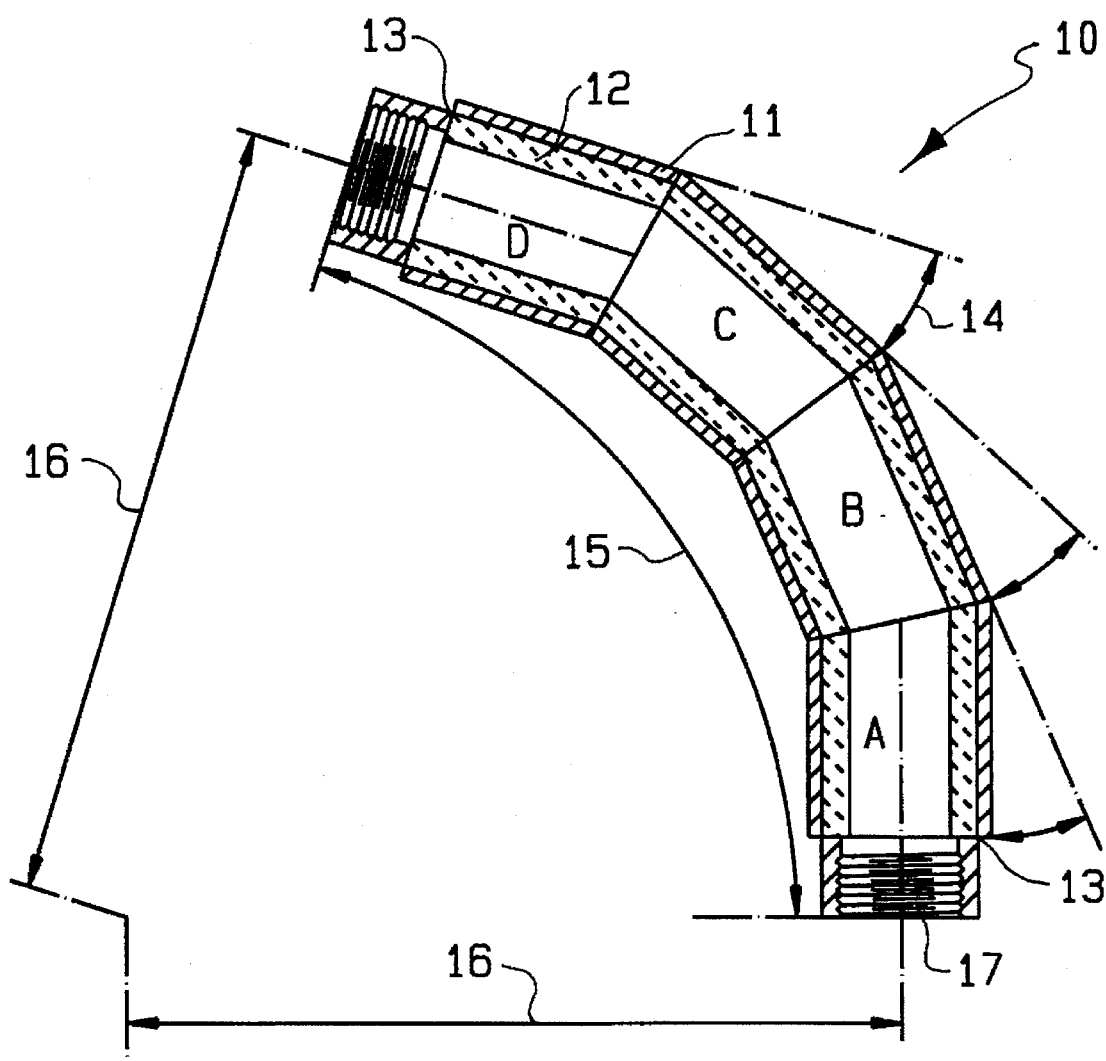
FIG. 1 is schematic of the preferred embodiment of a ceramic material lined sweep nozzle.

FIG. 1 illustrates an abrasion resistant material lined sweep nozzle according to the present invention. One typical use for this device is with a nozzle mix gunning apparatus used for replacing the refractory lining on metallurgical furnaces, such as those used in the production of steel. To limit the duration of furnace "down time," refinishing operations are frequently carried out while the furnace is at an elevated temperature. Therefore, the operator must remain outside the furnace during the refinishing operation, and the nozzle of the gunning apparatus must be designed to ensure that the stream of gunning material is applied at as close as possible to a 90° angle to all of the interior surfaces of the furnace so that the surfaces are coated with a minimum of rebound and drip, and the adherence, durability, and other properties of the gunned material are optimized. Otherwise, furnace down time will be increased because of the need to clean out the waste material provided from the rebound.

In the foregoing example, the nozzle of the present invention is subjected to elevated temperatures, which require a temperature resistant material such as a ceramic or high temperature composite. Alternatively, in situations where high temperature conditions do not occur, such as in the ambient temperature application of the gunning material, resistance to high temperature is not required, and other materials can be used, including rubber, other elastomers, or plastics. In particular, gum rubber has been shown to be a useful material because its resilience allows the gunning material to bounce off without causing appreciable deterioration or wear to the rubber lining. When elastomers or plastics are used as the lining material, the pipe sections should be connected using a joining procedure which does not deteriorate the lining. In addition, the entire nozzle can be made of an elastomeric or plastic material. One of ordinary skill in the art is aware of the various lining or fabrication procedures for elastomer and plastic materials, so that no further explanation is necessary herein.

To achieve the desired change of direction of the sprayed or gunned material, a curved or angled nozzle is required. If the nozzle is curved or angled properly, the operator can orient the nozzle so that the gunning stream is substantially at a 90° angle to any interior surface of an enclosed space that requires coating. In addition, the interior of the nozzle must be sufficiently hard to resist the impact and abrasion of the gunned material, or it may wear out in as little as five minutes of use, because of the impact of the abrasive gunned material on the inner surface of the nozzle.

As shown in FIG. 1, the nozzle 10 of the present invention is constructed from multiple sections A,B,C,D, of abrasion resistant lined pipe. The outer jacket 11 of each section is preferably constructed of metal pipe, such as steel or other suitable material, which is capable of withstanding the elevated temperature and the internal nozzle pressure commonly encountered in the gunning process and maintaining the integrity of the liner. Each section of pipe 11 is initially prepared in the desired angular size and length. To resist the abrasive materials which are to be gunned, each section is provided with an abrasion resistant liner 12. According to the most preferred embodiment of the invention, the abrasive resistant liner is made of a ceramic material such as alumina, silicon carbide, zirconia toughened alumina, or other ceramic having similar hardness characteristics, for high temperature use, or an elastomer or plastic material, for low temperature use. These materials can resist the impact and abrasion of the gunning material during extended gunning periods. In the most preferred embodiment, a ceramic liner 12 with a thickness of between about 5/16 inch and about ½ inch and an internal diameter of about 1 to 3 inches, preferably about 2 inches, is used. Other sizes can be used for these components depending upon the specific application.

In the preferred embodiment, each section of abrasion resistant material lined pipe is substantially straight, without significant degree of curvature. This avoids divergence of the stream of gunned material which will increase the amount of rebound because a significant part of the stream will impact the surface at an angle other than 90°. The nozzle of the present invention produces a tightly packed, homogenous mass of gunning material on the target surface, which reduces the amount of rebound and pipe drip that is found with the divergent stream produced by a nozzle made from smoothly curved pipe or pipe fittings.

In addition, it is convenient to construct the nozzle from sections which when connected have a symmetry about a central axis to minimize the number of different sections that need to be prepared. For the preferred embodiment shown in the drawing figure, only two differently configured sections are required: sections A and D are the same, and sections B and C are the same. Even when shorter length sections are utilized, the ends can be of the same sized components, with a predetermined number of identical intermediate components used, so that only two differently configured components (i.e., the end and the intermediate sections) are required.

In the most preferred embodiment, the ceramic liner 12 of each section may be a single component of a tubular ceramic having an outer diameter such that it fits snugly within the outer jacket 11 with minimum space between the outer jacket 11 and the ceramic liner 12. In the alternative, the ceramic liner 12 may be constructed from a plurality of ceramic tiles which are configured to fit together to form the tube of ceramic material, and are keyed so that the tubular shape is maintained and does not collapse in on itself, even without the use of glue or other adhesives during installation of the tiles in the outer jackets. Even where there are slight spaces between the tiles after installation, these spaces are rapidly filled with the material to be gunned so that fluid flow or turbulence difficulties are avoided during operation of the nozzle.

When installing the tiles or liner into the outer jackets, it is convenient to begin with the end of the nozzle (i.e., section A) that has a threads for coupling the nozzle to the hose which carries the material to be gunned. The interior bore of the outer jacket of section A is reduced, which provides a shoulder 13 which acts as a stop for the forward positioning of the ceramic insert or tiles. Thereafter, the next section of outer jacket (i.e., B) would be welded to section A and then provided with its ceramic liner or tiles. The liner of section A will act as a stop for the insertion of the liner in section B. This procedure is continued for sections C, D, etc., until the entire nozzle is constructed. If desired, the final section can include threads for connection to another hose of conduit for directing the gunning material to the surface. When a section such as D is used, the interior shoulder 13 will help retain the liner in position in the outer jacket.

To retain the liner 12 in the outer jackets 11, the liner can be configured as a tube having a slightly widened portion or greater diameter on its rear end relative to its front end diameter. This enables the liner to be placed into the outer jacket and then be retained in position by the widened structure. Such structure also prevents forward movement of the liner through the outer jacket.

It is also possible to purchase ready-made ceramic lined pipe sections from a variety of sources. One particularly preferred lined pipe material is know as silicon carbide and such silicon carbide lined pipe can be purchased from a variety of sources known to those of ordinary skill in the art.

Before any of the abrasion resistant lined pipe sections can be joined, the ends of the each section should be mitered or otherwise configured to produce the desired curvature of the nozzle. Thus, when the sections are joined by an appropriate means, such as a butt weld, the appropriate change of direction of the material to be sprayed by the nozzle is achieved. By varying the miter angle 14 and the number of sections, any desired angle of curvature 15 for the nozzle can be obtained.

In the present invention, the angle of curvature 15 of the nozzle may range from about 25° to substantially 90° nozzle angles of about 25° to 55° can be used for a slight curvature of the direction of the gunning material, while greater angles of up to about 85° can be used for surfaces which are more difficult to access. An angle of substantially 90° is used for the greatest change of direction of the stream. In the most preferred embodiment, four sections 10 of lined mitered pipe are used with a miter angle 14 of about 23.33° for each joint, to provide the nozzle with a total angle of curvature of approximately 70°.

The radius of center line curvature 16 for the preferred embodiment can range from about 6 inches to about 16 inches, with a most preferred radius of center line curvature of 10 inches. This results in a nozzle of about 16 inches to about 18 inches in length, including the pipe couplings 17, which are attached by an appropriate means to each end of the nozzle.

The invention described and illustrated herein is capable of a variety of modifications within the ability of persons of ordinary skill in the art. For example, if desired, the liner can be configured with a flange or similar component which will assist in the proper positioning of the liner within the outer jacket. All such modifications are considered to be within the spirit and scope of the appended claims.

What is claimed is:

1. A nozzle comprising a plurality of tubular sections, each section having an inner surface with an abrasion resistant material adjacent thereto for protecting the surface against abrasion and at least one end portion which is angled, said abrasion resistant material forming an internal bore which is substantially straight in each tubular section, and means for joining the sections together to produce an angle of curvature in the nozzle of between about 25° and 90°.

2. The nozzle of claim 1 wherein in each section the abrasion resistant material is a single substantially tubular liner component.

3. The nozzle of claim 1 wherein in each section the abrasion resistant material comprises a plurality of abrasion resistant tiles which are interconnected to form a substantially tubular abrasion resistant liner component.

4. The nozzle of claim 1 wherein at least three tubular sections are joined to produce an angle of curvature in the nozzle of between about 45° and 90°.

5. The nozzle of claim 1 wherein at least four tubular sections are joined to produce an angle of curvature in the nozzle of between about 55° and 85°.

6. The nozzle of claim 1 wherein only two or three different tubular sections are utilized to form the nozzle.

7. The nozzle of claim 1 wherein at least one of the tubular sections includes means for connection to a fluid directing component.

8. The nozzle of claim 1 wherein the abrasion resistant material is a ceramic material.

9. The nozzle of claim 8 wherein the ceramic material comprises alumina, silicon carbide or zirconia toughened alumina.

10. The nozzle of claim 1 wherein the abrasion resistant material is an elastomer or plastic material.

* * * * *